United States Patent
Lösch et al.

(10) Patent No.: US 8,044,158 B2
(45) Date of Patent: Oct. 25, 2011

(54) METHOD FOR THE PRODUCTION OF WATER-ABSORBING POLYMER ARTICLES BY POLYMERIZING DROPS OF A MONOMER SOLUTION

(75) Inventors: Dennis Lösch, Altrip (DE); Marco Krüger, Mannheim (DE); Uwe Stueven, Bad Soden (DE); Wilfried Heide, Freinsheim (DE); Matthias Weismantel, Jossgrund-Oberndorf (DE); Stefan Blei, Mannheim (DE)

(73) Assignee: BASF SE, Ludwigshafen (DE)

( * ) Notice: Subject to any disclaimer, the term of this patent is extended or adjusted under 35 U.S.C. 154(b) by 77 days.

(21) Appl. No.: 12/674,143

(22) PCT Filed: Aug. 25, 2008

(86) PCT No.: PCT/EP2008/061054
§ 371 (c)(1),
(2), (4) Date: Feb. 18, 2010

(87) PCT Pub. No.: WO2009/027356
PCT Pub. Date: Mar. 5, 2009

(65) Prior Publication Data
US 2011/0105707 A1 May 5, 2011

(30) Foreign Application Priority Data

Aug. 30, 2007 (EP) .................................. 07115291

(51) Int. Cl.
*C08F 120/06* (2006.01)
(52) U.S. Cl. .................................. 526/317.1; 526/235
(58) Field of Classification Search ................ 526/317.1
See application file for complete search history.

(56) References Cited

U.S. PATENT DOCUMENTS

| | | | |
|---|---|---|---|
| 7,727,586 B2 * | 6/2010 | Bruhns et al. | 427/213 |
| 2010/0010176 A1 * | 1/2010 | Losch et al. | 526/88 |
| 2010/0016505 A1 * | 1/2010 | Losch et al. | 524/804 |
| 2010/0029866 A1 * | 2/2010 | Losch et al. | 526/64 |
| 2010/0035059 A1 * | 2/2010 | Losch et al. | 428/402 |
| 2010/0062932 A1 * | 3/2010 | Losch et al. | 502/402 |

* cited by examiner

*Primary Examiner* — David W Wu
*Assistant Examiner* — Vu A Nguyen
(74) *Attorney, Agent, or Firm* — Marshall, Gerstein & Borun LLP

(57) ABSTRACT

A process for producing water-absorbing polymer particles by polymerizing droplets of a monomer solution in a surrounding gas phase, wherein the monomer solution comprises at least 0.0002% by weight of oxygen and the oxygen content of the gas phase is at least 0.5% by volume.

12 Claims, No Drawings

METHOD FOR THE PRODUCTION OF WATER-ABSORBING POLYMER ARTICLES BY POLYMERIZING DROPS OF A MONOMER SOLUTION

CROSS-REFERENCE TO RELATED APPLICATIONS

This is the U.S. national phase application of International Application No. PCT/EP2008/061054, filed Aug. 25, 2008, which claims the benefit of European patent application No. 07115291.2, filed Aug. 30, 2007.

The present invention relates to a process for producing water-absorbing polymer particles by polymerizing droplets of a monomer solution in a surrounding gas phase, wherein the monomer solution comprises at least 0.0002% by weight of oxygen and the oxygen content of the gas phase is at least 0.5% by volume.

The production of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening.

Spray polymerization allows the process steps of polymerization and drying to be combined. In addition, the particle size can be adjusted within certain limits by virtue of suitable process control.

The production of water-absorbing polymer particles by polymerizing droplets of a monomer solution is described, for example, in EP 348 180 A1, EP 816 383 A1, WO 96/40427 A1, U.S. Pat. No. 4,020,256, US 2002/0193546, DE 35 19 013 A1, and DE 10 2005 044 035 A1, and the prior PCT application PCT/EP2007/051146.

DE 10 2005 044 035 A1 describes a spray polymerization process with a specific apparatus for droplet generation. According to the technical teaching disclosed, oxygen should be prevented both in the monomer solution and in the gas phase.

The prior PCT application PCT/EP2007/051146 describes a spray polymerization process with a defined oxygen content of the gas phase.

It was an object of the present invention to provide an improved process for producing water-absorbing polymer particles by polymerizing droplets of a monomer solution in a gas phase surrounding the droplets.

In particular, it was an object of the present invention to provide a process which generates water-absorbing polymer particles with a high yield and is not particularly prone to faults.

The object was achieved by a process for producing water-absorbing polymer particles by polymerizing droplets of a monomer solution comprising
a) at least one ethylenically unsaturated monomer,
b) optionally a crosslinker,
c) least one initiator and
d) water,
in a surrounding gas phase, wherein the monomer solution comprises at least 0.0002% by weight of oxygen and the oxygen content of the gas phase is at least 0.5% by volume.

The oxygen content of the monomer solution is preferably from 0.0002 to 0.003% by weight, more preferably from 0.0003 to 0.002% by weight, most preferably from 0.0004 to 0.001% by weight. The customary inertization of the monomer solution can therefore substantially be dispensed with.

The elevated oxygen content stabilizes the monomer solution and enables the use of smaller amounts of polymerization inhibitor, and hence reduces the product discolorations caused by the polymerization inhibitor.

Excessively low oxygen concentrations lead to undesired polymerization in the dropletization apparatus and hence to production shutdowns. Excessively high oxygen concentrations influence the polymerization kinetics in an unfavorable manner.

It has additionally been found that, in the case of a relatively high oxygen content in the gas phase, a lower level of wall deposits arises and hence the yield increases.

The oxygen content of the gas phase is preferably from 0.5 to 15% by volume, more preferably from 1 to 10% by volume, most preferably from 2 to 5% by volume.

As well as oxygen, the gas phase preferably comprises nitrogen. The nitrogen content of the gas phase is preferably at least 80% by volume, more preferably at least 90% by volume, most preferably at least 95% by volume.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid.

Particularly preferred monomers are acrylic acid and methacrylic acid. Very particular preference is given to acrylic acid.

The preferred monomers a) have at least one acid group, the acid groups preferably being at least partly neutralized.

The proportion of acrylic acid and/or salts thereof in the total amount of monomers a) is preferably at least 50 mol %, more preferably at least 90 mol %, most preferably at least 95 mol %.

The acid groups of the monomers a) are typically partly neutralized, preferably to an extent of from 25 to 85 mol %, preferentially to an extent of from 50 to 80 mol %, more preferably from 60 to 75 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred as alkali metals, but very particular preference is given to sodium hydroxide, sodium carbonate or sodium hydrogencarbonate, and mixtures thereof. Typically, the neutralization is achieved by mixing in the neutralizing agent as an aqueous solution, as a melt or preferably also as a solid. For example, sodium hydroxide with a water content significantly below 50% by weight may be present as a waxy material having a melting point above 23° C. In this case, metered addition as piece material or melt at elevated temperature is possible.

The monomers a), especially acrylic acid, comprise preferably up to 0.025% by weight of a hydroquinone monoether. Preferred hydroquinone monoethers are hydroquinone monomethyl ether (MEHQ).

The monomer solution comprises preferably at most 160 ppm by weight, preferentially at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

The polymerization inhibitors can, though, also be removed from the monomer solution by absorption, for example on activated carbon.

Crosslinkers b) are compounds having at least two free-radically polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of at least 40-tuply ethoxylated glycerol, of at least 40-tuply ethoxylated trimethylolethane or of at least 40-tuply ethoxylated trimethylolpropane.

Very particularly preferred crosslinkers b) are the polyethoxylated and/or polypropoxylated glycerols which have been esterified with acrylic acid or methacrylic acid to give di- or triacrylates, as described, for example in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The monomer solution comprises preferably at least 0.01% by weight, preferentially at least 0.02% by weight, more preferably at least 0.05% by weight, most preferably at least 0.1% by weight, of crosslinker b), based in each case on monomer a).

The initiators c) used may be all compounds which disintegrate into free radicals under the polymerization conditions, for example peroxides, hydroperoxides, hydrogen peroxide, persulfates, azo compounds and redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane] dihydrochloride and 2,2'-azobis[2-(5-methyl-2-imidazolin-2-yl)propane] dihydrochloride, and photoinitiators such as 2-hydroxy-2-methylpropiophenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxy-methylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)phenyl]-2-hydroxy-2-methyl-1-propan-1-one, and mixtures thereof.

The initiators are used in customary amounts, for example in amounts of from 0.001 to 5% by weight, preferably from 0.01 to 2% by weight, based on the monomers a).

The solids content of the monomer solution is preferably at least 35% by weight, preferentially at least 38% by weight, more preferably at least 40% by weight, most preferably at least 42% by weight. The solids content is the sum of all constituents which are involatile after the polymerization. These are monomer a), crosslinker b) and initiator c).

The monomer solution is metered into the gas phase to form droplets. The droplets can be generated, for example, by means of a dropletizer plate.

A dropletizer plate is a plate having at least one bore, the liquid entering the bore from the top. The dropletizer plate or the liquid can be oscillated, which generates a chain of ideally monodisperse droplets at each bore on the underside of the dropletizer plate. In a preferred embodiment, the dropletizer plate is not agitated.

The number and size of the bores are selected according to the desired capacity and droplet size. The droplet diameter is typically 1.9 times the diameter of the bore. What is important here is that the liquid to be dropletized does not pass through the bore too rapidly and the pressure drop over the bore is not too great. Otherwise, the liquid is not dropletized, but rather the liquid jet is broken up (sprayed) owing to the high kinetic energy. The Reynolds number based on the throughput per bore and the bore diameter is preferably less than 2000, preferentially less than 1000, more preferably less than 500 and most preferably less than 250.

The dropletizer plate has typically at least one bore, preferably at least 10, more preferably at least 50 and typically up to 10 000 bores, preferably up to 5000, more preferably up to 1000 bores, the bores typically being distributed uniformly over the dropletizer plate, preferably in so-called triangular pitch, i.e. three bores in each case form the corners of an equilateral triangle. The diameter of the bores is adjusted to the desired droplet size.

However, the droplets can also be generated by means of pneumatic drawing dies, rotation, cutting of a jet or rapidly actuable microvalve dies.

In a pneumatic drawing die, a liquid jet together with a gas stream is accelerated through a diaphragm. The gas rate can be used to influence the diameter of the liquid jet and hence the droplet diameter.

In the case of droplet generation by rotation, the liquid passes through the orifices of a rotating disk. As a result of the centrifugal force acting on the liquid, droplets of defined size are torn off. Preferred apparatus for rotary dropletization are described, for example, in DE 43 08 842 A1.

The emerging liquid jet can also be cut into defined segments by means of a rotating blade. Each segment then forms a droplet.

In the case of use of microvalve dies, droplets with defined liquid volume are generated directly.

The droplets generated have a mean diameter of preferably at least 200 µm, more preferably of at least 250 µm and most preferably of at least 300 µm, the droplet diameter being determinable by means of light scattering and meaning the volume-average mean diameter.

The polymerization reactor is flowed through by a gas. The carrier gas can be conducted through the reaction chamber in cocurrent or in countercurrent to the free-falling droplets of the monomer solution, preferably in cocurrent, i.e. from the bottom upward. After one pass, the carrier gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3% and most preferably up to 1%.

The gas velocity is preferably adjusted such that the flow in the polymerization reactor is directed, for example no convection currents opposed to the general flow direction are present, and is, for example, from 0.01 to 5 m/s, preferably from 0.02 to 4 m/s, more preferably from 0.05 to 3 m/s, most preferably from 0.1 to 2 m/s.

The gas flowing through the reactor is appropriately preheated to the reaction temperature upstream of the reactor.

The gas entrance temperature, i.e. the temperature with which the gas enters the reaction chamber, is preferably from 160 to 250° C., more preferably from 180 to 230° C., most preferably from 190 to 220° C.

Advantageously, the gas entrance temperature is controlled in such a way that the gas exit temperature, i.e. the temperature with which the gas leaves the reaction chamber, is from 100 to 180° C., more preferably from 110 to 160° C., most preferably from 120 to 140° C.

The reaction can be carried out under elevated pressure or under reduced pressure; preference is given to a reduced pressure of up to 100 mbar relative to ambient pressure.

The reaction offgas, i.e. the gas leaving the reaction chamber, may, for example, be cooled in a heat exchanger. This condenses water and unconverted monomer a). The reaction offgas can then be reheated at least partly and recycled into the reactor as cycle gas. A portion of the reaction offgas can be discharged and replaced by fresh gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The polymer particles can subsequently be postcrosslinked for further improvement of the properties.

Postcrosslinkers are compounds which comprise at least two groups which can form covalent bonds with the carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols as described in DE 33 14 019 A1, DE 35 23 617 A1 and EP 450 922 A2, or β-hydroxyalkylamides, as described in DE 102 04 938 A1 and U.S. Pat. No. 6,239,230.

In addition, DE 40 20 780 C1 describes cyclic carbonates, DE 198 07 502 A1 describes 2-oxazolidone and its derivatives such as 2-hydroxyethyl-2-oxazolidone, DE 198 07 992 C1 describes bis- and poly-2-oxazolidinones, DE 198 54 573 A1 describes 2-oxotetrahydro-1,3-oxazine and its derivatives, DE 198 54 574 A1 describes N-acyl-2-oxazolidones, DE 102 04 937 A1 describes cyclicureas, DE 103 34 584 A1 describes bicyclic amide acetals, EP 1 199 327 A2 describes oxetanes and cyclic ureas, and WO 2003/31482 A1 describes morpholine-2,3-dione and its derivatives, as suitable postcrosslinkers.

The amount of postcrosslinker is preferably from 0.01 to 1% by weight, more preferably from 0.05 to 0.5% by weight, most preferably from 0.1 to 0.2% by weight, based in each case on the polymer.

The postcrosslinking is typically performed in such a way that a solution of the postcrosslinker is sprayed onto the hydrogel or the dry polymer particles. The spraying is followed by thermal drying, and the postcrosslinking reaction can take place either before or during the drying.

The spraying of a solution of the crosslinker is preferably performed in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige mixers, Bepex mixers, Nauta mixers, Processall mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a staged dryer, a rotary tube oven or a heatable screw. It is particularly advantageous to mix and dry in a fluidized bed dryer.

Preferred drying temperatures are in the range from 170 to 250° C., preferably from 180 to 220° C. and more preferably from 190 to 210° C. The preferred residence time at this temperature in the reaction mixer or dryer is preferably at least 10 minutes, more preferably at least 20 minutes, most preferably at least 30 minutes.

The water-absorbing polymer particles obtainable by the process according to the invention have a centrifuge retention capacity (CRC) of typically at least 15 g/g, preferably at least 20 g/g, preferentially at least 25 g/g, more preferably at least 30 g/g and most preferably at least 35 g/g. The centrifuge retention capacity (CRC) of the water-absorbing polymer particles is typically less than 100 g/g. The centrifuge retention capacity of the water-absorbing polymer particles is determined by the EDANA (European Disposables and Nonwovens Association) recommended test method No. 441.2-05 "Centrifuge retention capacity".

The mean diameter of the water-absorbing polymer particles obtainable by the process according to the invention is preferably at least 200 µm, more preferably from 250 to 600 µm, very particularly from 300 to 500 µm, the particle diameter being determinable by light scattering and meaning the volume-average mean diameter. 90% of the polymer particles have a diameter of preferably from 100 to 800 μm, more preferably from 150 to 700 μm and most preferably from 200 to 600 μm.

The present invention further provides water-absorbing polymer particles obtainable by the process according to the invention.

The water-absorbing polymer particles are tested by means of the test methods described below.

Methods:

The measurements should, unless stated otherwise, be performed at an ambient temperature of 23±2° C. and a relative air humidity of 50±10%. The water-absorbing polymer particles are mixed thoroughly before the measurement.

Residual Monomers

The content of residual monomers of the water-absorbing polymer particles is determined by the EDANA (European Disposables and Nonwovens Association) recommended test method No. 410.2-05 "Residual monomers".

Moisture Content

The moisture content of the water-absorbing polymer particles is determined by the EDANA (European Disposables and Nonwovens Association) recommended test method No. 430.2-05 "Moisture content".

Centrifuge Retention Capacity (CRC)

The centrifuge retention capacity of the water-absorbing polymer particles is determined by the EDANA (European Disposables and Nonwovens Association) recommended test method No. 441.2-05 "Centrifuge retention capacity".

Yield

To determine the yield, the polymer particles discharged from the dropletizer tower are dried, and the mass of the dried polymer particles is divided by the mass of the monomers used. Wall deposits in the dropletizer tower are not taken into account.

The EDANA test methods are obtainable, for example, from the European Disposables and Nonwovens Association, Avenue Eugène Plasky 157, B-1030 Brussels, Belgium.

EXAMPLES

Example 1

Comparative Test 1.6 kg of acrylic acid and 14.4 kg of sodium acrylate (37.5% by weight solution in water) were mixed with 12 g of 3-tuply ethoxylated glycerol triacrylate (approx. 85% strength by weight). The oxygen content of the monomer solution was 0.0006% by weight. The resulting mixture was dropletized in a heated dropletizing tower (height 12 m, width 2 m, gas velocity 0.1 m/s in cocurrent). The metering rate of the mixture was 16 kg/h. The dropletizer plate had 30×170 μm bores. The initiator was metered into the monomer solution upstream of the dropletizer by means of a static mixer. The initiators used were 580 g/h of a 5% by weight solution of 2,2'-azobis[2-(2-imidazolin-2-yl)propane] dihydrochloride in water and 440 g/h of a 3% by weight solution of sodium peroxodisulfate in water. The heating output of the gas preheating was controlled such that the gas outlet temperature in the dropletization tower was a constant 130° C.

The gas phase consisted of a nitrogen/oxygen mixture. The oxygen content of the gas phase was 0.1% by volume.

The resulting polymer particles had a centrifuge retention capacity (CRC) of 31.7 g/g, a moisture content of 16.1% by weight and a residual monomer content of 0.188% by weight.

The dropletization tower was operated at a steady state for 2 hours. The yield was 75.3% by weight.

Example 2

The procedure of example 1 was repeated. The oxygen content was raised to 1% by volume.

The resulting polymer particles had a centrifuge retention capacity (CRC) of 30.5 g/g, a moisture content of 16.9% by weight and a residual monomer content of 0.1575% by weight.

The dropletization tower was operated at a steady state for 2 hours. The yield was 82.8% by weight.

Example 3

The procedure of example 1 was repeated. The oxygen content was raised to 2.5% by volume.

The resulting polymer particles had a centrifuge retention capacity (CRC) of 32.6 g/g, a moisture content of 16.2% by weight and a residual monomer content of 0.2225% by weight.

The dropletization tower was operated at a steady state for 2 hours. The yield was 81.7% by weight.

Example 4

The procedure of example 1 was repeated. The oxygen content was raised to 5% by volume.

The resulting polymer particles had a centrifuge retention capacity (CRC) of 32.7 g/g, a moisture content of 16.3% by weight and a residual monomer content of 0.141% by weight.

The dropletization tower was operated at a steady state for 2 hours. The yield was 80.5% by weight.

The invention claimed is:

1. A process for producing water-absorbing polymer particles by polymerizing droplets of a monomer solution comprising
    a) at least one ethylenically unsaturated monomer,
    b) optionally a crosslinker,
    c) at least one initiator, and
    d) water,
in a surrounding gas phase in a reaction chamber, wherein the monomer solution comprises at least 0.0002% by weight of oxygen and an oxygen content of the gas phase is at least 0.5% by volume.

2. The process according to claim 1, wherein the monomer solution comprises at least 0.0004% by weight of oxygen.

3. The process according to claim 1, wherein the oxygen content of the gas phase is at least 1% by volume.

4. The process according to claim 1, wherein the oxygen content of the gas phase is at most 10% by volume.

5. The process according to claim 1, wherein a nitrogen content of the gas phase is at least 80% by volume.

6. The process according to claim 1, wherein the gas phase flows through the reaction chamber at a rate of at least 0.01 m/s.

7. The process according to claim 6, wherein a gas entrance temperature is at least 160° C.

8. The process according to claim 6, wherein a gas exit temperature is at most 180° C.

9. The process according to claim 1, wherein monomer a) is acrylic acid to an extent of at least 50 mol %.

10. The process according to claim 9, wherein the acrylic acid has been neutralized to an extent of at least 25 mol %.

11. The process according to claim 1, wherein the monomer solution comprises at least 0.01% by weight of crosslinker b), based on monomer a).

12. The process according to claim 1, wherein the droplets have a mean diameter of at least 200 μm.

* * * * *